US006750850B2

(12) United States Patent
O'Leary (10) Patent No.: US 6,750,850 B2
(45) Date of Patent: *Jun. 15, 2004

(54) VIEWER SYSTEM FOR A WIRELESS DEVICE

(75) Inventor: Michael J. O'Leary, Redmond, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/191,848

(22) Filed: Nov. 12, 1998

(65) Prior Publication Data

US 2001/0050675 A1 Dec. 13, 2001

Related U.S. Application Data

(60) Provisional application No. 60/070,720, filed on Jan. 7, 1998.

(51) Int. Cl.[7] .................................................. H04B 1/38
(52) U.S. Cl. ..................... 345/169; 146/352; 146/902; 455/90; 455/312; 455/313; 455/556; 455/566; 455/575
(58) Field of Search ................................ 345/146, 169, 345/352, 902; 455/31.2, 31.3, 90, 556, 566, 575; 707/102

(56) References Cited

U.S. PATENT DOCUMENTS

| 4,862,390 A | | 8/1989 | Weiner ........................ 364/521 |
| 5,121,470 A | * | 6/1992 | Trautman .................... 395/140 |
| 5,206,931 A | * | 4/1993 | Kimura et al. .............. 345/347 |
| 5,295,241 A | | 3/1994 | Eagen et al. ................. 364/157 |
| 5,317,306 A | | 5/1994 | Abraham et al. ............ 345/118 |
| 5,333,316 A | | 7/1994 | Champagne et al. ........ 395/600 |
| 5,384,579 A | | 1/1995 | Nakasuji et al. ............. 345/123 |
| 5,396,264 A | * | 3/1995 | Falcone et al. .............. 345/146 |
| 5,485,175 A | | 1/1996 | Suzuki ......................... 395/156 |
| 5,495,566 A | | 2/1996 | Kwatinetz .................... 395/157 |
| 5,510,811 A | | 4/1996 | Tobey et al. ................. 345/157 |
| 5,563,631 A | | 10/1996 | Masunaga .................... 345/169 |
| 5,568,603 A | | 10/1996 | Chen et al. ................... 395/155 |
| 5,655,094 A | | 8/1997 | Cline et al. .................. 395/341 |
| 5,659,665 A | | 8/1997 | Whelpley, Jr. .............. 395/2.84 |
| 5,666,502 A | * | 9/1997 | Capps .......................... 345/352 |
| 5,666,526 A | | 9/1997 | Reiter et al. ................. 395/602 |
| 5,673,401 A | | 9/1997 | Volk et al. ................... 395/327 |
| 5,677,708 A | | 10/1997 | Matthews, III et al. ..... 345/115 |
| 5,689,668 A | | 11/1997 | Beaudet et al. ............. 395/353 |
| 5,689,669 A | | 11/1997 | Lynch et al. ................ 395/355 |
| 5,689,807 A | * | 11/1997 | Wong et al. ................. 455/38.1 |
| 5,696,686 A | * | 12/1997 | Sanka et al. ................. 700/110 |
| 5,754,306 A | | 5/1998 | Taylor et al. ................ 358/400 |

(List continued on next page.)

OTHER PUBLICATIONS

Advanced Interface Design Guide, IBM Corp., 59–61, 63–72, Jun. 1989.
Cowart, "Mastering Windows 3.1", Sybex, Inc., pp. 18–20, 28–29, 266–267, 414–417, 836–838, 1993.
Cowart, "Mastering Windows 3.1", Sybex, pp. 268–269, 1993.
. Microsoft Schedule + v7.0a, Microsoft Corp., screen dump pp. 1–13, 1996.

*Primary Examiner*—Bipin Shalwala
*Assistant Examiner*—Vincent E. Kovalick
(74) *Attorney, Agent, or Firm*—Westman, Champlin & Kelly, P.A.; S. Koehler; T. Fronek (57) ABSTRACT

A system and method for rendering information on a wireless personal information manager device includes reading viewing control parameters in a dataset stored in memory on the device. The dataset further includes a plurality of records to be selectively viewed. The viewing control parameters are processed to render the records selectively on the device.

40 Claims, 6 Drawing Sheets

U.S. PATENT DOCUMENTS

| | | | |
|---|---|---|---|
| 5,757,279 A | * 5/1998 | Fujiwara | 340/825.44 |
| 5,758,295 A | 5/1998 | Ahlberg et al. | 455/566 |
| 5,760,776 A | 6/1998 | McGurrin et al. | 345/353 |
| 5,761,610 A | * 6/1998 | Sorensen et al. | 455/575 |
| 5,790,115 A | 8/1998 | Pleyer | 345/327 |
| 5,812,117 A | 9/1998 | Moon | 345/169 |
| 5,815,142 A | 9/1998 | Allard et al. | 345/173 |
| 5,819,108 A | 10/1998 | Hsu et al. | 395/830 |
| 5,848,064 A | 12/1998 | Cowan | 370/338 |
| 5,848,373 A | * 12/1998 | DeLorme et al. | 701/200 |
| 5,969,698 A | * 10/1999 | Richard et al. | 345/7 |
| 5,973,612 A | 10/1999 | Deo et al. | 340/825.44 |
| 5,999,088 A | * 12/1999 | Sibbitt | 340/311.1 |
| 6,011,976 A | 1/2000 | Michaels et al. | 455/466 |
| 6,031,830 A | 2/2000 | Cowan | 370/338 |
| 6,125,360 A | 9/2000 | Witkowski et al. | 707/2 |
| 6,128,012 A | 10/2000 | Seidensticker, Jr. et al. | 345/336 |
| 6,212,527 B1 | * 4/2001 | Gustman | 707/102 |
| 6,226,665 B1 | 5/2001 | Deo et al. | 709/106 |
| 6,493,717 B1 | * 12/2002 | Junkin | 707/102 |

* cited by examiner

VIEWER SYSTEM FOR A WIRELESS DEVICE

REFERENCE TO CO-PENDING PATENT APPLICATIONS

The present application claims priority from and fully incorporates herein U.S. provisional patent application Serial No. 60/070,720 filed on Jan. 7, 1998, and U.S. patent application entitled "WIRELESS DATABASE ENVIRONMENT FOR A SMALL DEVICE", Ser. No. 09/107,916 filed Jun. 30, 1998.

BACKGROUND OF THE INVENTION

Personal information managers (PIMs) are tools that greatly enhance access to information required in various social and business activities. The information may include lists of important telephone numbers, scheduled events or meetings, addresses, important dates, things to be done, items to be purchased—in short, almost any type of data that might be needed by a person.

One type of PIM that has already been developed is the Timex Data Link Watch™ wristwatch. This watch includes a microprocessor and non-volatile memory used to store data that can subsequently be recalled to appear on a liquid crystal display (LCD) screen on the watch. Data that are used by the watch are initially entered on a personal computer, for example, using Microsoft Corporation's Schedule+™ or Lotus' Organizer™ personal scheduling software. To store selected data within the non-volatile memory of the watch, a data link feature is executed in the software running on the personal computer that causes display lines on the computer screen to flash in a manner that encodes the selected data. A light sensor on the watch detects the flashing lines on the computer screen, and the data encoded and conveyed thereby are decoded by a processor in the watch and stored in the memory of the watch for subsequent recall by the user.

While a wristwatch that stores data for access by a user is a significant step forward in making the PIM data available whenever required, it has several limitations. The LCD of the watch is relatively small, enabling only a few characters of text to be displayed. Further, the memory of the watch is very limited. Editing of the data stored in the watch is impractical, since there is no keyboard or other facility to enter alphanumeric characters. Unless the watch is brought back to the personal computer to download new data, the information stored in the memory of the watch cannot easily be changed.

A different type of data management system is required that is sufficiently small to be readily transportable like the Data Link Watch™, but is capable of displaying more data and includes additional functions that are not practical in the Data Link Watch™ PIM device.

U.S. patent application entitled "USER INTERFACE FOR A PORTABLE DATA MANAGEMENT DEVICE WITH LIMITED SIZE AND PROCESSING CAPABILITY", Ser. No. 08/826,542, filed Apr. 3, 1997, which is herein incorporated by reference in its entirety, discloses another personal information manager having a display on which a plurality of lines of data can be presented to the user. The device is generally the size of a pager and can be worn by the user easily with a belt clip. The device includes a first pair and a second pair of controls (e.g., buttons) for user interaction and control of the display. Generally, data in the device are stored in a hierarchical manner. As used herein, the data comprises a dataset or database where individual records comprise one or more fields. The buttons allow the user to switch between "levels" of the hierarchical structure as well as within each of the "levels". Data can be displayed in a Table of Contents list, or individually, as records.

It should be noted that small electronic computing devices often referred to as personal digital assistants (PDA) also are commonly available. Many such devices are handheld devices, or palm-size devices, which comfortably fit within the hand. One commercially available device is sold under the trade name HandHeld PC (or H/PC) having software provided by Microsoft Corporation of Redmond, Washington. Generally, the PDA device includes a processor, random access memory (RAM), and an input device such as a keyboard and a display. The keyboard can be integrated with the display, such as where the keyboard is incorporated as a time sensitive display. Although such devices are useful as a personal information manager, in some situations, the PDA device may be too large to be conveniently carried by the user.

There is a continuing need to provide a more flexible personal information manager for storing and accessing datasets. Particularly, there is a need to view and update a dataset on a personal information manager.

SUMMARY OF THE INVENTION

A system and method for rendering information on a wireless personal information manager device includes reading viewing control parameters in a dataset stored in memory on the device. The dataset further includes a plurality of records to be selectively viewed. The viewing control parameters are processed to render the records selectively on the device. Instructions can be provided on a computer readable medium to implement the method.

DETAILED DESCRIPTION OF THE PREFERRED EMBODIMENTS

Figure 1:
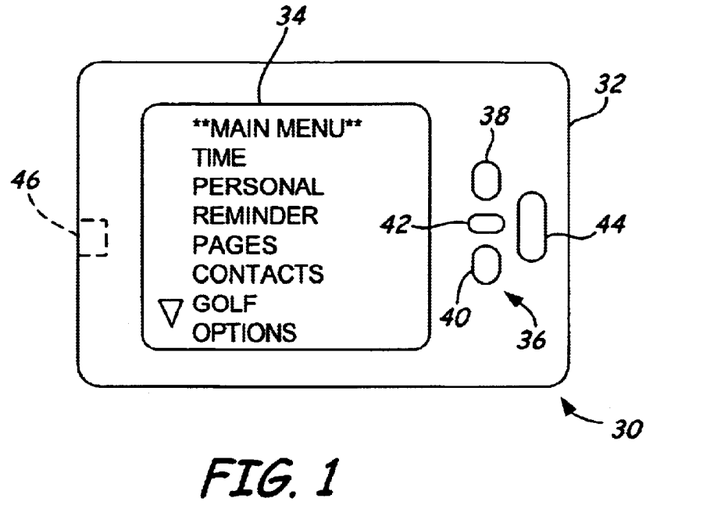
FIG. 1 is a plan view of a first embodiment of a wireless personal information manager device embodying the present invention.

An exemplary form of the present invention is embodied in a combination pager and data management device 30 illustrated in FIG. 1. However, it is contemplated that the present invention can also be practiced using other readily portable electronic devices having limited memory and display resources for executing application software. For example, a combination cellular phone and data management device employing the present invention would achieve virtually all of the benefits and advantages of the present invention. Such devices will have enhanced utility compared to existing portable PIM devices and other portable electronic devices, and the functions and compact size of such devices will more likely encourage the user to carry the device at all times. Accordingly, it is not intended that the scope of the present invention be limited by the disclosure of the invention as embodied in an exemplary pager and PIM device 30.

A top view of the pager and data management device 30 is shown in FIG. 1. The device 30 includes a housing 32 and has a user interface that includes a plurality of keys 36 disposed on the top of the housing 32 and having four buttons that are used to control a display 34 and the functions performed in connection with its conventional paging function and its PIM data management functions. The buttons comprise an Action button 42, a Back button 44, an Up button 38, and a Down button 40. The buttons navigate the user through a directory/menu hierarchy like that shown in FIG. 1. The Action/Back buttons 42, 44 are paired as opposites, having a pair functionality similar to that of the Enter and Escape keys on a conventional QWERTY keyboard. The Action button 42 takes the user in (to a selected lower level) and the Back button 44 takes the user out (to a next higher or parent level in a the hierarchical structure). The Up/Down buttons 38, 40 are another functional pair of buttons that move the user up and down within the display 34. Display 34 is preferably a liquid crystal display (LCD), which in the one embodiment can display a maximum of eight lines, with 17 characters per line. Other types and sizes of displays can alternatively be used, as appropriate for the type of device in which the present invention is included. Generally, the invention realizes most benefits on displays having approximately 240 or less character display capabilities.

Figure 2:
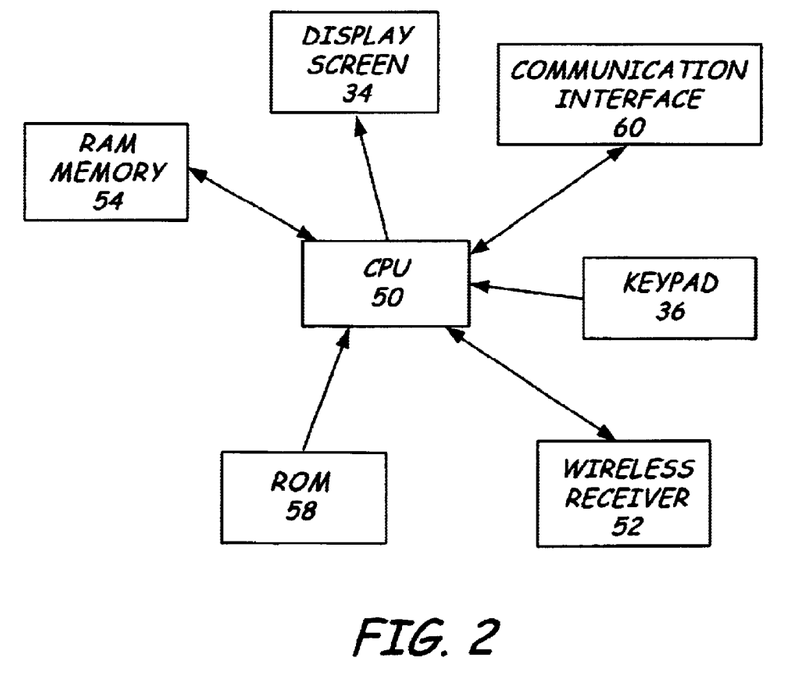
FIG. 2 is a schematic functional block diagram of the device of FIG. 1.

Referring now to FIG. 2, a block diagram illustrates the functional components comprising the device 30. An eight-bit central processing unit (CPU) 50 implements the software controlled functions, although it will be understood that CPUs employing either more or fewer bits can alternatively be employed. CPU 50 is coupled to display 34 so that text and graphic icons generated in accordance with the controlling software appear on the display 34. Data that are downloaded or entered by the user into the device 30 are stored in a non-volatile read/write memory store 54, and this memory is bidirectionally coupled to the CPU, which reads and writes the data in a serial stream. In one embodiment, the CPU is a Zilog Corporation type Z80 running from 2–4 MHz. The capacity of non-volatile read/write memory store 54, which is provided as battery-backed random access memory (RAM), is only about 16 KB in the exemplary embodiment. The store 54 provides volatile storage for instructions that are executed by the CPU 50 when applets are run on the device 30, and storage for temporary data, such as register values. Default values for configuration options and other variables are stored in a ROM 58. The ROM 58 is also used to store the operating system software for the device that controls the basic functionality of the device 30, e.g., its conventional paging function and other operating system kernel functions, e.g., the loading of applet software components into store 54.

Memory 54 simply serves as storage for the code in a manner analogous to the function of a hard drive on a PC that is used to store application programs, i.e., storing the applet code until the applet is required to be executed by a user. It should be noted that although non-volatile memory is used for storing the applet code, it can alternatively be stored in a volatile memory that is not used for execution of the code. Further, if more than one applet is stored in this storage memory (non-volatile or volatile), the total size of the code for all such applets must be less than the capacity of the storage memory The applets are written in compact p-code, which allows them to be extremely small in size compared to more conventional application programs written to be executed on PCs. The p-code is processor independent, since the operating system for a specific type of processor can translate the p-code into the required machine instructions needed for that type of processor.

The p-code is divided into modules or software components. Operating as a state machine, specific modules of p-code are swapped into the RAM of the device 30 for execution by the CPU so that an extremely small run-time footprint in memory is required when executing an applet.

Paging signals received by the device 30 are handled through a wireless receiver 52, which is coupled to CPU 50. As already noted, keys 36 provide a simple user interface to permit control of the device 30, editing, and other user determined selections entered with the four buttons 38, 40, 42 and 44. Since the data stored in non-volatile memory 54 are likely to be more extensive than a user would care to enter using only the four buttons, such data are more efficiently entered on a computer 55 (FIG. 3) and downloaded to the device 30 through a communication interface 60. The interface 60 comprises an infrared sensor/transmitter 46 (shown in FIG. 1), which communicates through an infrared data port 57 of the computer 55. Similarly, data are typically uploaded to the computer 55 from the device 30 through the IR interface. Data can alternatively be downloaded from the computer 55 to the device 30 through a paging signal transmission to the wireless receiver 52.

Display 34 is employed to present bitmapped characters in 8 rows by 17 columns, allowing a substantial amount of information to be viewed at one time. Although not shown in FIG. 1, above the display area of the device 30 is a row of icons indicating other aspects of the device, and on the left-hand side of the display area may be one or two auxiliary icons resembling up and down arrows. These arrow icons are used to indicate that lines of items are available above and/or below the lines currently shown on the display. Specifically, the up arrow icon indicates that hidden lines exist above the visible text, and the down arrow icon indicates hidden lines exist below the visible text.

Navigation on the device 30 is done with hierarchical menus, enabling the user to move through a tree structure. FIG. 1 illustrates the Main Menu on display 34. The first line of a menu may be its title (" MAIN MENU " in this case). The menu title is in upper case and is set off with asterisks to visually distinguish it from the other items in the menu.

The user moves a selection line (which causes the line to appear in reverse video on the display) up and down to select a desired list item. When the selection line is at the bottom and the down arrow icon is showing on the display 34, the next Down button 40 push scrolls the list up one line, keeping the selection line at the bottom. When the selection line is on the last list item, the down arrow icon is no longer displayed, and additional Down button 40 pushes do nothing. The analogous process applies to the Up button 38. The title line is never selectable, but it scrolls off the display 34 as if it were just another list item, as depression of the Down button 40 moves the selected line below the original bottom line displayed. These same rules normally apply when applets are being executed on the device 30 that display information to the user.

Figure 3:
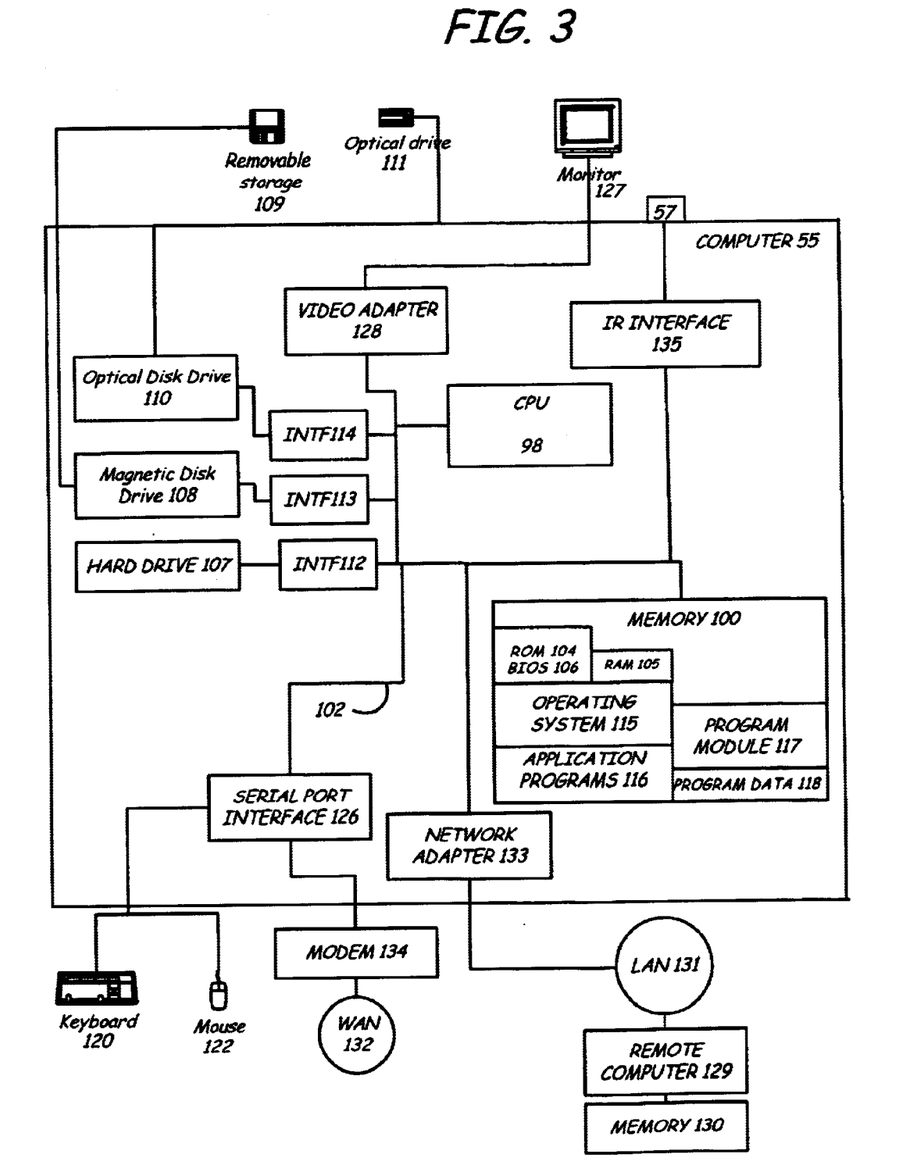
FIG. 3 is a block diagram of one embodiment of a desktop computer.

FIG. 3 and the related discussion are intended to provide a brief, general description of a suitable desktop computer 55 used for transferring datasets to the device 30. Although not required, the invention will be described, at least in part, in the general context of computer-executable instructions, such as program modules, being executed by a personal computer 55 or device 30. Generally, program modules include routine programs, objects, components, data structures, etc. that perform particular tasks or implement particular abstract data types. Moreover, those skilled in the art will appreciate that desktop computer 55 may be implemented with other computer system configurations, including multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 3, an exemplary system for implementing desktop computer 55 includes a general purpose computing device in the form of a conventional personal computer 55, including processing unit 98, a system memory 100, and a system bus 102 that couples various system components including the system memory 100 to the processing unit 98. The system bus 102 can be any of several types of bus structures including a memory bus or memory controller, a peripheral bus, and a local bus using any of a variety of bus architectures. The system memory 100 includes read only memory (ROM) 104 a random access memory (RAM) 105. A basic input/output system (BIOS) 106, containing the basic routine that helps to transfer information between elements within the desktop computer 55, such as during start-up, is stored in ROM 104. The desktop computer 55 further includes a hard disk drive 107 for reading from and writing to a hard disk (not shown), a magnetic disk drive 108 for reading from or writing to removable magnetic disk 109, and an optical disk drive 110 for reading from or writing to a removable optical disk 111 such as a CD ROM or other optical media. The hard disk drive 107, magnetic disk drive 108, and optical disk drive 110 are connected to the system bus 102 by a hard disk drive interface 112, magnetic disk drive interface 113, and an optical drive interface 114, respectively. The drives and the associated computer-readable media provide non-volatile storage of computer readable instructions, data structures, program modules and other data for the desktop computer 55.

Although the exemplary environment described herein employs a hard disk, a removable magnetic disk 109 and a removable optical disk 111, it should be appreciated by those skilled in the art that other types of computer readable media which can store data that is accessible by a computer, such as magnetic cassettes, flash memory cards, digital video disks (DVDs), Bernoulli cartridges, random access memories (RAMs), read only memory (ROM), and the like, may also be used in the exemplary operating environment.

A number of program modules can be stored on the hard disk, magnetic disk 109, optical disk 111, ROM 104 or RAM 105, including an operating system 115, one or more application programs 116 (which may include PIMs), other program modules 117 (which may include synchronization components for synchronizing data between the desktop computer 55 and the device 30 or 68), and program data 118. A user can enter commands and information into the desktop computer 55 through input devices such as a keyboard 120 or pointing device 122. Other input devices (not shown) may include a microphone, joystick, game pad, satellite dish, scanner, or the like. These and other input devices are often connected to the processing unit 98 through a serial port interface 126 that is coupled to the system bus 102, but may be connected by other interfaces, such as a sound card, a parallel port, game port or a universal serial bus (USB). A monitor 127 or other type of display device is also connected to the system bus 102 via an interface, such as a video adapter 128. In addition to the monitor 127, desktop computers can typically include other peripheral output devices such as speakers and printers.

The desktop computer 55 may operate in a networked environment using logic connections to one or more remote computers (other than device 30 or 68), such as a remote computer 129. The remote computer 129 can be another personal computer, a server, a router, a network PC, a peer device or other network node, and typically includes many or all of the elements described above relative to desktop computer 55, although only a memory storage device 130 has been illustrated in FIG. 3. The logic connections depicted in FIG. 3 include a local area network (LAN) 131 and a wide area network (WAN) 132. Such networking environments are commonplace in offices, enterprise-wide computer network intranets and the Internet.

When used in a LAN networking environment, the desktop computer 55 is connected to the local area network 131 through a network interface or adapter 133. When used in a WAN networking environment, the desktop computer 55 typically includes a modem 134 or other means for establishing communications over the wide area network 132, such as the Internet. The modem 134, which may be internal or external, is connected to the system bus 102 via the serial port interface 126. In a network environment, program modules depicted relative to desktop computer 55, or portions thereof, may be stored in the remote memory storage devices. It will be appreciated that the network connections shown are exemplary and other means of establishing a communications link between the computers may be used.

Desktop computer 55 runs operating system 115 that is typically stored in non-volatile memory 104 and executes on the processor 98. One suitable operating system is a WINDOWS brand operating system sold by Microsoft Corporation, such as "WINDOWS 95" or "WINDOWS NT", operating systems, other derivative versions of Windows brand operating systems, or another suitable operating system. Other suitable operating systems include systems such as the "MACINTOSH OS" sold from Apple Corporation, and the "OS/2 PRESENTATION MANAGER" sold by International Business Machines (IBM) of Armonk, N.Y. Application programs are preferably stored in program module 117, in volatile memory or non-volatile memory, or can be loaded into any of the components shown in FIG. 3 from a floppy diskette 109, CD ROM drive 111, downloaded from a network via network adapter 133, or loaded using another suitable mechanism.

The infrared data port 57 connects to the system bus 102 through an interface 135, which as stated above, can be used to download data to the device 30 when placed in proximity to the computer 55. Alternatively, data can be provided to the device 30 through a wireless paging network accessible by the computer 55 directly via a modem or through the LAN 131 or the WAN 132 networks.

Figure 4:
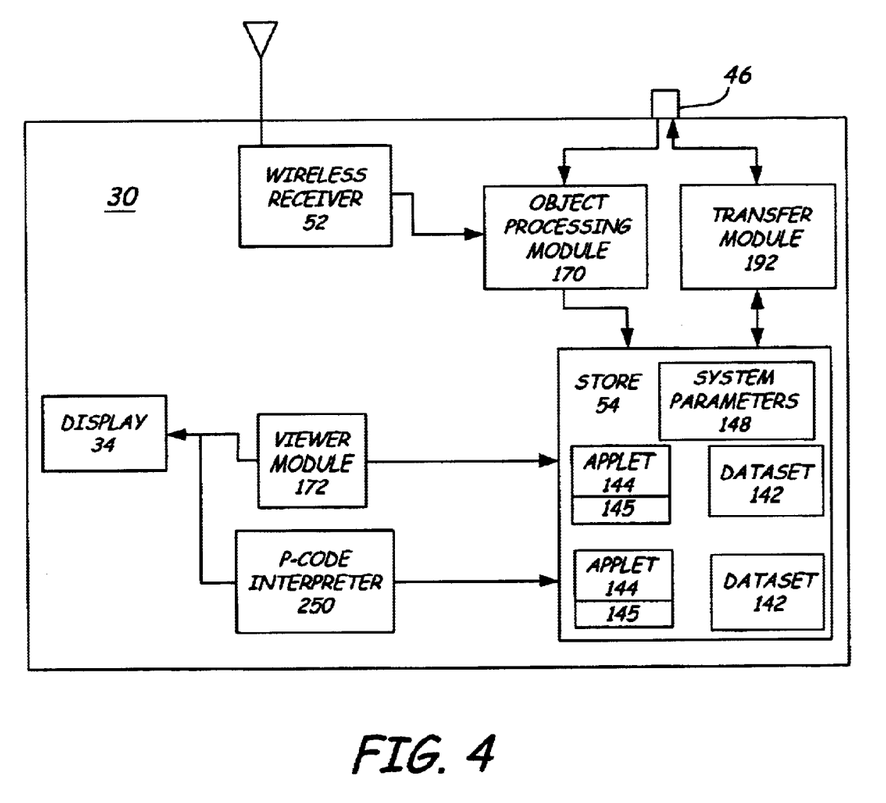
FIG. 4 is a block diagram of the device of FIG. 1 illustrating aspects of the present invention.

FIG. 4 is a functional block diagram of the device 30 for purposes of illustrating aspects of the present invention. The device 30 includes the wireless receiver 52 discussed above. The wireless receiver 52 receives incoming messages. The incoming messages can include "pages" comprising a single screen display or multiple screen displays of textual information as is commonly known in the art. The incoming messages can also be used to update information residing in memory store 54. In particular, the incoming messages, herein referred to as "objects", are used to update data stored in the memory store 54. The memory store 54 stores information used by the device 30 and includes datasets 142. Each dataset 142 comprises a database or list of information organized by individual records. Each individual record typically comprises multiple fields. For example, a dataset 142 can include a list of reminders comprising dates and times for performing tasks wherein the tasks are stored as string messages. In addition, a dataset 142 can also be a "contacts" list having names, addresses and phone numbers of various individuals or organizations stored for the user. The memory store 54 further stores applets 144 discussed above. Commonly, each applet 144 includes corresponding applet data 145 that the applet 144 uses and can execute calculations thereon. In yet another memory location in memory store 54, a system parameters list 148 can be maintained. The system parameters list 148 can include such information as when the device 30 will be active and produce audible tones for incoming messages, and when the device 30 is in "night mode", where the device 30 will receive incoming messages, but not produce audible tones. Other system parameters can include the current date and time and various types of audible tones to be produced for different types of incoming messages.

Figure 5:
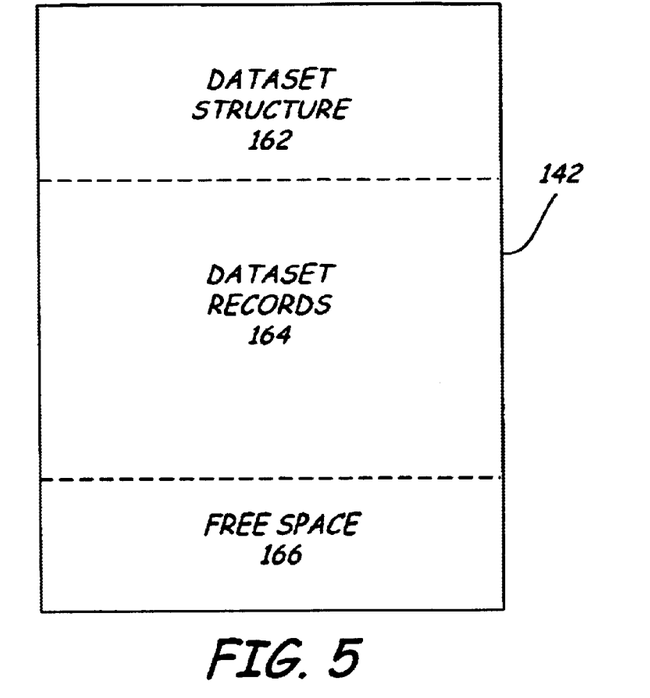
FIG. 5 is a pictorial representation of a dataset.

FIG. 5 illustrates one exemplary format for the dataset 142. In general, the dataset 142 includes a header portion 162 that defines the number and types of individual fields forming each of the records. The individual records are located in a portion 164. In one embodiment, the records in portion 164 are stored as a linked list. In the embodiment illustrated, each dataset 142 created in the memory store 54 is allocated memory upon creation. If additional records can be added to the dataset 142, for example, wirelessly using the wireless receiver 52 or through the IR port 46, the portion 164 includes free space 166 that will be used when the new records are received. Co-pending U.S. patent application Ser. No. 09/107,916 filed Jun. 30, 1998, entitled "WIRELESS DATABASE ENVIRONMENT SYSTEM AND METHOD FOR A SMALL DEVICE" describes a system and method for adding, deleting and changing data in memory store 54 using objects received wirelessly with the receiver 52. This application is incorporated herein by reference in its entirety. An object processing module 170 (FIG. 4) is provided to process incoming objects and update the memory store 54.

In addition to storing the format of the records portion 164, the header portion 162 also includes general information of the dataset 142 as well as control parameters used by a viewer module 172 to display the dataset 142 to the user. One aspect of the present invention is the viewer module 172. The viewer module 172 is compact in size, but allows the user to easily view, edit and manage each of the datasets 142.

Figure 6:
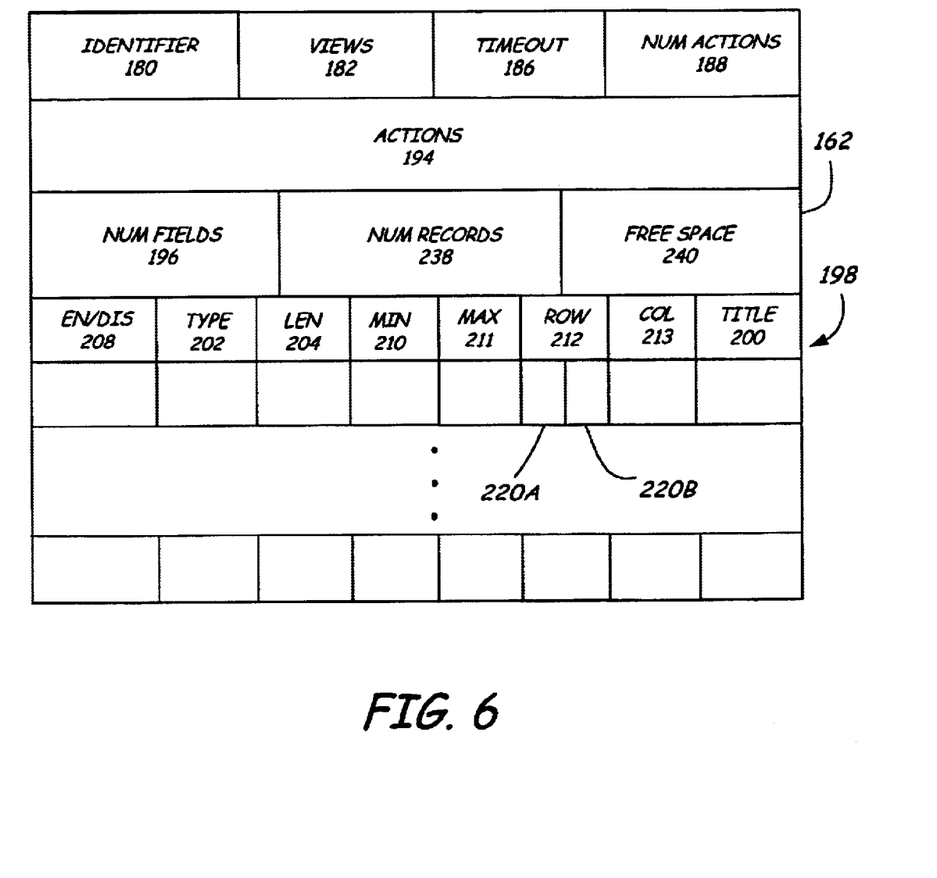
FIG. 6 is a pictorial representation of a portion of the dataset illustrated in FIG. 5.

FIG. 6 is a pictorial representation of the header portion 162 illustrating information stored therein. The header portion 162 includes a unique identifier 180 that identifies the dataset 142 from all other datasets stored in the memory store 54. The identifier 180 can be displayed on the display 34, or alternatively, a separate title entry can be provided in the header portion 162 which is displayed to the user to access the dataset 142. The identifier 180 is used to identify the dataset 142 when records are added, changed or deleted.

Figure 7:
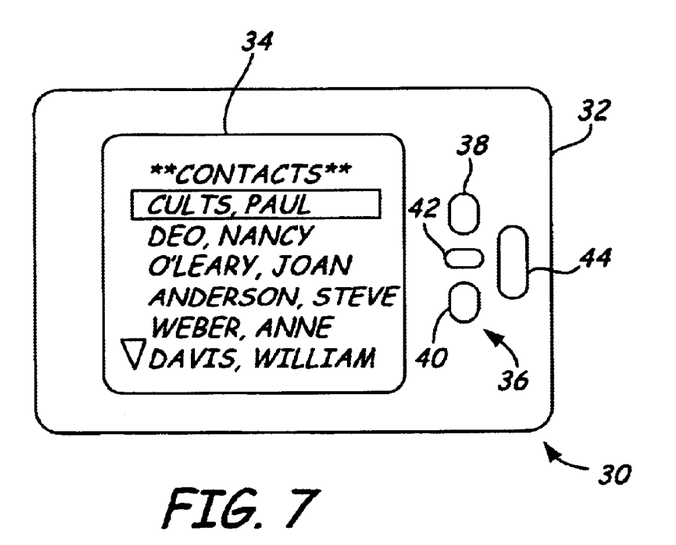
FIGS. 7–9 are screen displays shown on the device.
Figure 8:
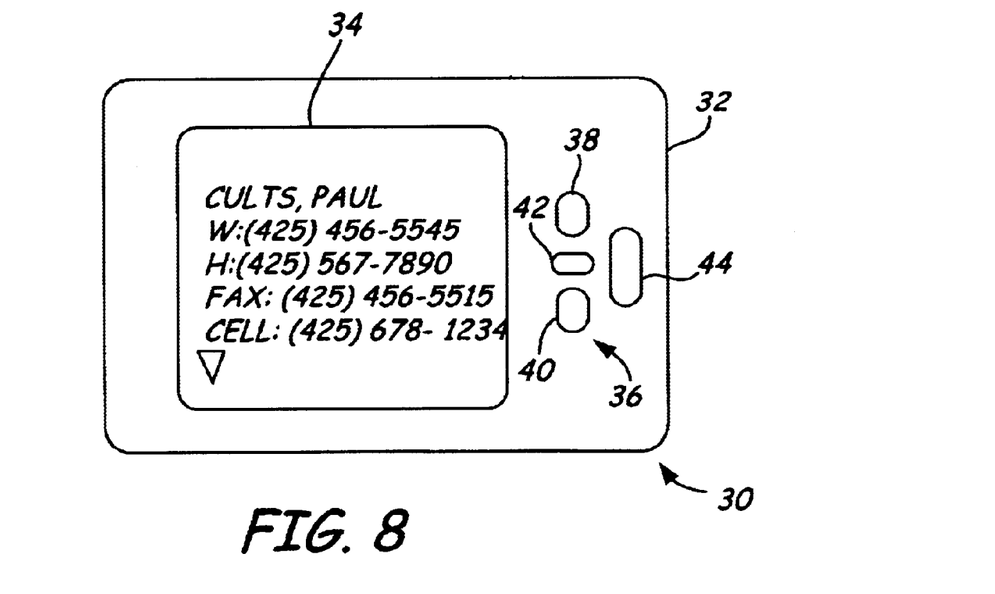

A value 182 is provided in the header portion 162 to indicate the types of views available for viewing the dataset 142. In the embodiment described, records of the dataset 142 can be viewed in the form of a "Table of Contents View" or individually as a "Record View". An example of a "Table of Contents View" is illustrated in FIG. 7. The "Table of Contents View" displays a plurality of records simultaneously on the display 34 wherein each record occupies one line of the display 34. Typically, the length of each record is longer than the display 34 such that only a portion of the record can be displayed. Operation of the keys 36 allows the user to display unseen records as well as unseen portions of records currently being displayed. By operating the keys 36, the user can "highlight" a desired record and, upon further operation of the keys 36, display the selected record as a "Record View", which is illustrated in FIG. 8. In the examples illustrated in FIGS. 8 and 9, the dataset is the "contacts" dataset wherein individual records comprise names of individuals and associated addresses and telephone numbers. In a further embodiment, only selected fields can be displayed in the "Table of Contents View" in order to provide a less cluttered display of information. The value stored at 182 in the header portion 162 indicates whether the user can display records in the "Table of Contents View" and/or the "Record View".

A value 186 indicates operation of the viewer module 172 due to inactivity of the user after viewing a particular dataset. In the embodiment illustrated, the value 186 corresponds to a "time-out" parameter wherein if the user accesses and views the dataset, but then does not press any of the keys 36 for a selected period of time, the viewer module 172 will exit the dataset and return to the main or root level. For instance, if the value 186 equals "1", the viewer module 172 will display the main or root level if the user does not press any of the keys 36 within a user selectable value (system wide parameter). If, on the other hand, the value 186 equals "0", the viewer module 172 will not automatically return to the main or root level. Although the display 34 may turn off in order to save battery power, upon operation of any of the keys 36, the viewer module 172 will display the dataset, and the particular record, which was last viewed.

Figure 9:
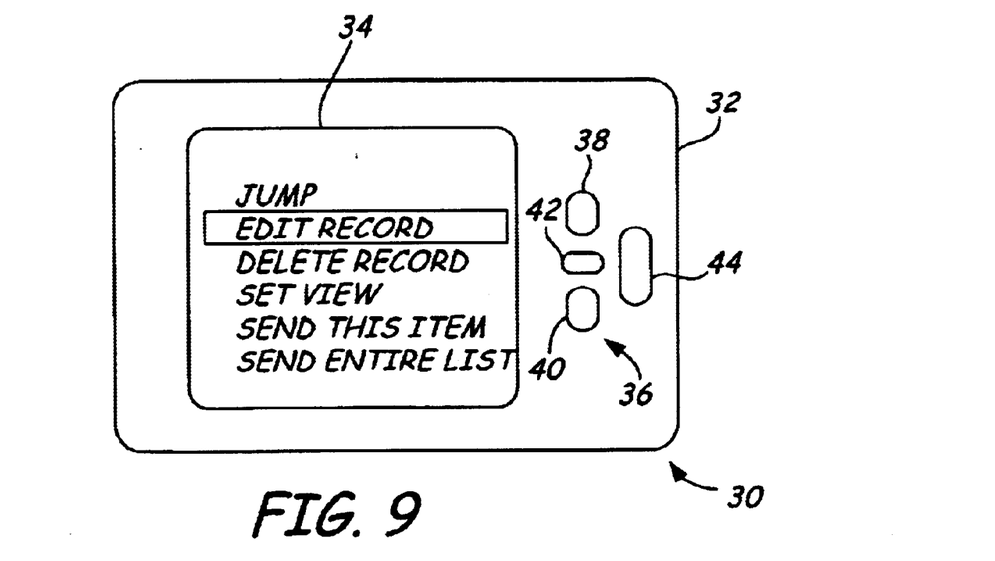

Value 188 in the header portion 162 indicates the number of functions which are available for manipulation of the dataset 142 upon storage in the memory store 54. In the embodiment described, there are six different actions that can be made available to the user for manipulation of the dataset 142. The actions include "editing a record", "deleting a record", "sending a record", "sending a dataset" and "setting field views". These actions are available upon activation of a preselected key when an individual record is being displayed with the "Record View". FIG. 9 illustrates each of the above actions including a "jump" action as displayed on the display 34. Using the keys 36, the user can highlight the desired action to be performed. The "jump" action is used when a long dataset is being viewed. The "jump" action allows the user to jump to a different record of the dataset 142 without having to return to the "Table of Contents View" and scroll through the records to find the desired record.

The "editing a record" action allows the user to make changes to selected fields in a particular record. After highlighting "edit record" in the display 34 illustrated in FIG. 9, the user presses a selected key 36 to then display a list of the fields that can be edited. Using the keys 36, the user can highlight the field to edit and toggle through the characters or digits in order to change individual values.

The "delete record" action allows the user to delete the record from the dataset. In one embodiment, the record that is deleted is the record previously displayed before the list of actions (FIG. 9) was displayed.

The "setting field views" action allows the user to selectively display fields in the dataset 142. Using the "contacts" dataset illustrated in FIGS. 7 and 8, by way of example, if desired, the user can hide the "fax" label and the associated value from being displayed when any of the records in the "contacts" dataset are displayed.

The action listed as "send this item" allows the user to send a particular record to another device, such as another PIM device. Highlighting and activation of this action using the keys 36 initiates execution of a transfer module 192 (FIG. 4). The transfer module 192 formats the record and transfers the record to the receiving device using, for example, the IR port 46. Similarly, when the action listed as "send entire list" is highlighted and activated, the complete dataset is transferred to the receiving device through the IR port 46 by the transfer module 192.

It should be noted that other types of actions can be listed and presented to the user in the list of FIG. 9. Such actions can be particularly applicable for certain types of datasets. For instance, a "toggle" action can be provided as an option to the user when the user is accessing a "tasks" dataset. The "toggle" action would allow the user to quickly mark the task as being completed without having to change a particular field through the "edit record" action.

As stated above, value 188 in FIG. 6 indicates the number of actions that can be performed on a particular dataset. Preferably, each of the available actions that can be implemented are listed individually in the header portion 162 as illustrated at 194.

The number of fields in each record is provided in the header portion 162 at 196. Characteristics of each field are then provided in section 198. In the embodiment illustrated, characteristics of each field include a title designation 200 and a type designation 202. Preferably, the available types of fields include a string of characters of variable length, a string of characters of fixed length, boolean variables, a number, a date, a time, phone numbers (U.S. format phone numbers, international format phone numbers and/or free format phone numbers). Other types of fields can include various combinations of the aforementioned, for example, a "reminder" field could include date, time and string fields. The length of the field is indicated at 204. Typically, the length is a quantity of bytes. A selected designation such as "0" can indicate that the field length is not fixed and can be variable.

Value 208 indicates whether the field of the record will be initially hidden or not hidden. This can be changed using the "setting field view" action described above.

Values 210, 211, 212 and 213 are used by the viewer module 172 to control the display of each respective field of each record on the display 34. Generally, viewer module 172 uses values 208, 210 and 211 when the corresponding field of a record is to be displayed in the "Table of Contents View", while the viewer module 172 uses values 208, 212 and 213 to display the corresponding field of a record under the "Record View". Each of these views will be discussed separately.

As described above, the "Table of Contents View" displays each record on one line of the display 34 in a manner similar to FIG. 7. Commonly, the length of the fields to display exceeds the number of characters available on each line of the display. Values 208, 210 and 211 control whether a particular field is displayed and, if so, how many characters of data of each field will be displayed on each line. Value 208 controls display of the corresponding field data independent of non-zero values in 210 and 211. In particular, if a value of 208 is indicative of "enable", viewer module 172 operates using the values in 210 and 211 to display data of the respective field. Likewise, if a value of 208 is indicative of "disable", viewer module 172 will not display data of the corresponding field.

Values 210 and 211 control the number of characters of data displayed for a given field. In the embodiment illustrated, value 210 specifies the minimum number of characters to be displayed of the data in the corresponding field. Value 211 specifies the maximum number of characters of data to display. In the example illustrated in FIGS. 7 and 8, the contacts dataset includes records having fields associated with an individual's name and various telephone numbers, among other information such as an address which is not shown. In the "Table of Contents View" of FIG. 7, fields not shown can be seen by using the buttons 36. For instance, if values 208, 210 and 211 are enabled and non-zero, scrolling to the right may allow the user to see one or more of the phone numbers to the extent allowed by the values 210 and 211. Likewise, if the values 210 and 211 are zero, then the associated phone number will not be displayed. Thus, in order to display data associated with any particular field, the value in value 208 must be "enabled" and the values 210 and 211 must be non-zero. If in the event the field is "disabled" or contains zeros in the values 210 and 211, then the next field will be displayed if properly configured in section 198. As appreciated by those skilled in the art, besides using the buttons 36 to scroll the line in the "Table of Context View", auto-scrolling can be provided for a selected line in the "Table of Contents View" or for the display 34 as a whole. Auto-scrolling is a well known technique used in pagers for displaying information that exceeds the display capabilities of a single screen display. In one embodiment, auto-scrolling is a user settable parameter. The viewer module 172 can access and obtain the current setting using, for example, an API call to the operating system of device 30.

Generally, data in the fields of the "Table of Contents View" are displayed in the order provided in section 198. However, by using the values in values 208, 210 and 211, the user is provided flexibility as to which and how much of each field is to be displayed. For example, the user can easily skip the display of a field by either setting the associated value in value 208 to "disable" or, providing zero entries in values 210 and 211. The title of each field contained in value 200 is displayed in the "setting field view" and while "editing a record". It should also be noted that although described above wherein the values 210 and 211 are used to define the minimum and maximum characters to display of the field data, other parameters to control the extent of data displayed can be used. For instance, values can be provided specifying the first character and the number of characters of the data in each field to be displayed.

It should also be noted that value 208 is provided to indicate whether or not a particular field can be hidden from view. Generally, value 208 does not store the current status of a particular field wherein this information is maintained by viewer module 172 during display of the corresponding dataset. Generally, the values 208 for each field are set upon creation of the dataset on the desktop computer. The dataset is then transferred to device 30. However, if desired, viewer module 172 can include functions to change the values in 208, or any of the other data stored in section 198.

Values 208, 212 and 213 control display of each corresponding field in the "Records View". From the foregoing, it should be evident that a value in 208 indicative of "disable" will cause the viewer module 172 not to display the corresponding field whereas a value of "enable" will cause the viewer module 172 to display the corresponding field. Values 212 and 213 determine where a particular field will begin to be displayed on the screen. Referring first to value 213, a non-zero entry corresponds to a specific vertical column on the screen 34 where the field will be displayed. In the view of FIG. 8, the "name" field has a value of "1" in value 213 and the phone numbers illustrated in FIG. 8 also has a value of "1" in value 213, and the value for 212 will be zero, thus causing the phone numbers to be displayed on column 1 of the next available line. In the event the value in 213 exceeds the total number of vertical columns of the display 34, the field would be displayed upon scrolling with the buttons 36 (or alternatively, via auto-scrolling, if enabled). In effect, virtual "pages" are available for displaying dataset information by selecting the value of 213 for each of the fields.

If desired, one or more of the fields in section 198 can have a value in 213 equal to "0". A "0" value is a preselected indicator to instruct the viewer module 172 to begin display of the field in the next available column. In one embodiment, the viewer module 172 also examines the number of columns necessary to display the field. If the number of columns necessary to display the field exceeds the remaining columns available on the display 34 for that line (row), the viewer module 172 will display that field on the next line at column "1".

Value 212 of each field stores display information for viewer module 172 in a manner similar to value 213. The value 212 for each field indicates which horizontal row will be used in order to display the field. In particular, non-zero entries correspond to the desired row for displaying the field. In the view of FIG. 8, the "name" field has a value of "1" in 212. In a manner similar to that described above for column placement, values greater than the total number of rows identify "virtual" pages accessible by operation of the buttons 36. In addition, a "0" entry indicates that the field should be placed on the next available row after displaying the previous field.

In a further embodiment, value 212 includes additional row information. Referring to FIG. 6, value 212 (typically a byte) can be considered as comprising a higher or first portion 220A also known as a "nibble" (4 bits) and a lower or second portion 220B. In this embodiment, portion 220B stores a value indicative of the starting row to display the field, while the portion 220A stores the number of additional rows that can be used to display the field. For example, an entry of "0" in portion 220A and an entry of "1" in portion 220B would indicate that the field is to be displayed on row 1 and no additional rows are to be used if the data exceeds one row. In this example, the user can access any additional data by scrolling the display with the buttons 36 or, if enabled, auto-scrolling will scroll the single line and display the additional information of the field. If, on the other hand, the values of portions 220A and 222B correspond to "1" and "1", respectively, the field will be displayed on the first row and one additional row can be used to display any additional information of the field. In this example, auto-scrolling will commonly be used to scroll the two rows being used to display the field in order to view other information contained in the field. In a third example, portions 220A and 220B can have an entry corresponding to "−1" ("F" Hex) and "1", respectively. In this example, the field will be displayed on the first row and the viewer module 172 can use as many rows as necessary to display all of the information in the field. Auto-scrolling of all of the rows can be performed if the total number of rows exceeds the capabilities of the display 34 or, alternatively, the user can use the buttons 36 to view the additional information.

Referring back to FIG. 6, the number of records in the dataset are indicated at 238. The amount of free space (typically given in bytes) is provided at 240. A textual representation of a dataset for storing and viewing stock reports for a particular stock is given below.

```
;
; Sample Stock Dataset
;
GENEREIC,MSFT;          Identifier Bytes
TocView;                RecView or TocView
NoTimeout;              NoTimeout or DefaultTimeout
5;                      Number of functions
Edit,Set View, Delete,Send Record,Send DataSet; Action
7;
;Enable/Disable
; ;Type
; ; ;Len (0=variable)
; ; ; ;Min
; ; ; ; ;Max
; ; ; ; ; ;Row
; ; ; ; ; ; ;Col
; ; ; ; ; ; ; ;Title
E,S,3,3,3,1,1,Day;
E,S,4,0,0,1,5,Date;
D,S,6,6,6,2,1,Low;
D,S,6,6,6,2,8,High;
E,S,6,6,6,2,15,Last;
E,S,0,0,0,4,1,InfoLine1;
E,S,0,0,0,4,1,InfoLine2;
5,100;                  Number of Records, Free space
Mo, 5/06,140.00,141.50,112.50,Dow +20;
Tu, 5/07,140.00,141.84,113.50,QtrRevenues, K;
We, 5/08,141.00,142.95,114.00, ,
Th., 5/09,141.50,142.85,114.75,New alliance with NEC,;
Fr, 5/10,142.00,143.00,116.75, , ;
```

(Note that all characters right of a ";" on any line pertain to a comment).

Although the header portion 162 of the dataset 142 includes a considerable amount of flexibility in defining and displaying fields of a dataset, there can still be situations where the structure does not meet the requirements of the user. In the embodiment illustrated in FIG. 4, a custom viewer can be used to display information. The custom viewer module is an applet 144 stored in the memory store 54. It should be noted that the memory store 54 can store multiple custom viewer modules as applets wherein each custom viewer module is used to display selected information. The custom viewer module or applet is written in a pseudo-code language that is not machine dependent in order that the applet 144 can be machine independent. As discussed above, the applet can be added or changed in the memory store 54 through the wireless receiver 52. A p-code interpreter 250 accesses the memory store 54 and, in particular, the applet 144 to be executed. Display formats chosen by the user to display information is encoded in the applet 144. The p-code interpreter 250 operates the display 34 in accordance with the encoded instructions contained in the applet 144. Commonly, the applet 144 is written on a computer, such as the desktop computer 55 (FIG. 3) that includes the keyboard 120 and the pointer device 122 to allow the applet 144 to be easily written. As discussed above, the applet 144 can then be transferred to the device 30 using either the wireless receiver 52 or the IR port 46.

Use of the applet 144 as a custom viewer may be best illustrated by an example. Consider the same example described above to deliver stock information. Using the dataset 142 and the viewer module 172, a service provider can send records to update the dataset 142 when new stock reports are issued. However, suppose the service provider would like to provide to the user a "30 day high/low price" or an "average price over the last 30 days". In a typical prior art device, this information is calculated by the service provider and sent as a page to the device. This page, like all other pages, is retained in a buffer, thereby requiring the user to scroll through all pages in order to find the particular page desired. Using the dataset 142 and the viewer module 172 described above, this information can be defined possibly as a record or as a field in a record of the dataset 142. Nevertheless, the service provider will have to calculate the "30 day high/low price" and the "average price" and send this information to the device 30 as an updated record. However, using an applet 144 as a custom viewer allows the service provider to transfer the calculation steps to the device 30. As discussed above, typically the applet 144 includes an associated applet data 145 that can be updated or changed in a manner similar to updating or changing a record in the dataset 142. In this manner, the service provider need only provide the stock quotes on a periodic or daily basis. Upon execution of the applet 142 using the p-code interpreter 250, the applet 142 operates on the associated applet data 145 to calculate the desired information that, being the "30 day high/low price" and the "average price", which are then displayed on the display 34. In this manner, the service provider does not need to calculate the desired information, but rather, only has to update the applet data 145.

Although the present invention has been described with reference to preferred embodiments, workers skilled in the art will recognize that changes may be made in form and detail without departing from the spirit and scope of the invention.

What is claimed is:

1. A method of rendering dataset information on a wireless personal information manager device by performing steps comprising:
   identifying a dataset stored in memory on the device using an identifier associated with the dataset, the dataset comprising a plurality of similarly structured records, each record having a plurality of fields, and viewing control parameters stored in the data set, such that each data set contains its corresponding viewing parameters associated with the plurality of records that indicate how the records are to be rendered;
   reading viewing control parameters in the dataset; and processing the viewing control parameters to render the records selectively on the device as a function of the viewing control parameters.

2. The method of claim 1 wherein the viewing control parameters include a list of actions available for managing the dataset.

3. The method of claim 2 wherein the viewing control parameters include a description of each field.

4. The method of claim 3 wherein the description includes a portion designating a title of each field.

5. The method of claim 4 wherein the description includes a portion designating a type of each field.

6. The method of claim 5 wherein the description includes a portion designating an amount of characters to display.

7. The method of claim 3 wherein the description includes a portion designating where on a screen to display data.

8. The method of claim 7 wherein the screen is organized in columns and rows and the portion designating where on the screen to display data includes a first portion designating row information and a second portion designating column information.

9. The method of claim 8 wherein the first portion includes a first subportion designating which row to begin displaying data and a second subportion designating how many rows of the screen to use to display data.

10. The method of claim 1 wherein the viewing control parameters include a value indicative of types of views that can be displayed.

11. A computer readable medium including instructions readable by a wireless personal information manager device which, when implemented, cause the deice to render dataset information on the device by performing steps comprising:
    identifying a dataset stored in memory on the device using an identifier associated with the dataset, the dataset comprising a plurality of similarly structured records, each record having a plurality of fields, and viewing control parameters stored in the data set, such that each data set contains its corresponding viewing parameters associated with the plurality of records that indicate how the records are to be rendered; reading viewing control parameters in the dataset; and processing the viewing control parameters to render the records selectively on the device as a function of the viewing control parameters.

12. The computer readable medium of claim 11 wherein the viewing control parameters include a list of actions available for managing the dataset.

13. The computer readable medium of claim 11 wherein the viewing control parameters include a description of each field.

14. The computer readable medium of claim 13 wherein the description includes a portion designating a title of each field.

15. The computer readable medium of claim 14 wherein the description includes a portion designating a type of each field.

16. The computer readable medium of claim 15 wherein the description includes a portion designating an amount of characters to display.

17. The computer readable medium of claim 13 wherein the description includes a portion designating where on a screen to display data.

18. The computer readable medium of claim 17 wherein the screen is organized in columns and rows and the portion designating where on the screen to display data includes a first portion designating row information and a second portion designating column information.

19. The computer readable medium of claim 18 wherein the first portion includes a first subportion designating which row to begin displaying data and a second subportion designating how many rows of the screen to use to display data.

20. The computer readable medium of claim 11 wherein the viewing control parameters include a value indicative of types of views that can be displayed.

21. A wireless personal information manager device comprising:
    a display;
    a memory device for storing a dataset comprising an identifier, a plurality of similarly structured records, each record having a plurality of fields, and viewing control parameters stored in the data set, such that each data set contains its corresponding viewing parameters associated with the plurality of records that indicate how the records are to be rendered; and a viewer module coupled to the display and coupled to the memory device to access the dataset, the viewer module identifying the dataset using the identifier and reading the viewing control parameters to display the records as a function of the viewing control parameters.

22. The device of claim 21 wherein the viewing control parameters include a list of actions available for managing the dataset.

23. The device of claim 21 wherein the viewing control parameters include a description of each field.

24. The device of claim 23 wherein the description includes a portion designating a title of each field.

25. The device of claim 24 wherein the description includes a portion designating a type of each field.

26. The device of claim 25 wherein the description includes a portion designating an amount of characters to display.

27. The device of claim 23 wherein the description includes a portion designating where on the display to display data.

28. The device of claim 27 wherein the display is organized in columns and rows and the portion designating where on the display to display data includes a first portion designating row information and a second portion designating column information.

29. The device of claim 28 wherein the first portion includes a first subportion designating which row to begin displaying data and a second subportion designating how many rows of the display to use to display data.

30. The device of claim 21 wherein the viewing control parameters include a value indicative of types of views that can be displayed.

31. A wireless personal information manager device having a display and a memory for storing a dataset, the dataset comprising:

an identifier associated with the dataset; a plurality of similarly structured records, each record having a plurality of fields; and a set of viewing control parameters stored in the data set, such that each data set contains its corresponding viewing parameters associated with plurality of records that indicate how the records are to be rendered.

32. The device of claim 31 wherein the set of viewing control parameters include a list of actions available for managing the dataset.

33. The device of claim 31 wherein the set of viewing control parameters include a description of each field.

34. The device of claim 33 wherein the description includes a portion designating a title of each field.

35. The device of claim 34 wherein the description includes a portion designating a type of each field.

36. The device of claim 35 wherein the description includes a portion designating an amount of characters to display.

37. The device of claim 33 wherein the description includes a portion designating where on the display to display data.

38. The device of claim 37 wherein the display is organized in columns and rows and a portion designating where on the display to display data includes a first portion designating row information and a second portion designating column information.

39. The device of claim 38 wherein the first portion includes a first subportion designating which row to begin displaying data and a second subportion designating how many rows of the display to use to display data.

40. The device of claim 31 wherein the set of viewing control parameters include a value indicative of types of views that can be displayed.

* * * * *